United States Patent

[11] 3,622,800

[72] Inventor Shibly Joseph Abela
  Mount Royal, Quebec, Canada
[21] Appl. No. 77,089
[22] Filed Oct. 1, 1970
[45] Patented Nov. 23, 1971
[73] Assignee Canadian Marconi Company
  Montreal, Quebec, Canada
[32] Priority Oct. 27, 1969
[33] Canada
[31] 65,983

[54] ELECTRONIC CIRCUIT FOR CONVERTING DC TO AC ANALOGUE SIGNALS
7 Claims, 2 Drawing Figs.

[52] U.S. Cl. .................................................. 307/229,
  307/233, 307/271, 328/142
[51] Int. Cl. .................................................. H03k 17/00
[50] Field of Search ........................................ 307/229,
  233, 271; 328/160, 142; 321/49

[56] References Cited
OTHER REFERENCES
High-performance voltage-to-frequency converter by Cakulev, Electronic Engineering, 3/69 ppgs. 346– 348 copy in 307/27

*Primary Examiner*—Donald D. Forrer
*Assistant Examiner*—B. P. Davis
*Attorney*—Fetherstonhaugh and Co.

ABSTRACT: The disclosure teaches a completely electronic circuit for converting a DC analogue signal to a corresponding AC analogue signal. An AC reference signal is fed to the noninverting input terminal of a high gain differential amplifier whose output position modulates a pulse oscillator. The output of the oscillator is fed to a first low pass filter, which has a cutoff frequency slightly higher than the frequency of the AC reference. The output of the first filter is fed to the inverting terminal of the amplifier so that, when the gain of the amplifier is great enough, the output of the filter is substantially identical to the AC reference signal. The output of the oscillator is fed to the control terminal of a gate whose signal input is fed with the DC analogue signal so that the output of the gate is the pulse train of the oscillator multiplied by the DC analogue level. The gated output is fed to a second filter, which is substantially identical to the first filter, and whose output constitutes the AC analogue signal.

INVENTOR
S. J. ABELA

ELECTRONIC CIRCUIT FOR CONVERTING DC TO AC ANALOGUE SIGNALS

This invention relates to means for converting a DC analogue signal to a corresponding AC analogue signal. More specifically, this invention relates to electronic means for converting a DC analogue signal to a corresponding AC analogue signal.

There is often a requirement to convert a DC analogue signal to its corresponding AC analogue level. For example, before a DC analogue level can be fed to an autopilot mechanism, it must be converted to a 400 Hz. signal with an amplitude that bears some relation to the DC level. In addition, a DC level must be converted to AC before it can be utilized by an AC analogue computer.

In the above examples, an AC reference level is supplied. The DC analogue level is then compared to a DC reference level, and the AC reference level is reduced to provide the AC analogue level in such a manner that the ratio of AC analogue level/AC reference level corresponds to the ratio of DC analogue level/DC reference level. It is, of course, critical that the phase integrity of the AC analogue and reference signals be maintained.

One prior art means for converting a DC analogue level to a corresponding AC analogue level consists of a servo loop in which the moving arm of a potentiometer, which is excited with a DC reference voltage, is connected to one input of a comparator. The other input of the comparator is the DC analogue voltage, and the output of the comparator is fed to a servo amplifier. The amplifier drives a motor whose shaft is connected to the potentiometer arm, and the motor is driven in such a direction as to position the potentiometer arm so that the voltage between the potentiometer arm and ground is equal to the DC analogue voltage. The shaft is also connected to the moving arm of a second potentiometer which is excited by an AC reference voltage. The AC analogue voltage is taken from the moving arm of the second potentiometer, and, because both arms are driven by the same shaft, the ratio of AC analogue voltage/AC reference voltage corresponds to the ratio of DC analogue voltage/DC reference voltage.

The main problems of this electromechanical loop are:
1. Large power consumption
2. Low reliability of electromechanical components (Motor and potentiometer)
3. High costs—mainly in electromechanical components
4. Speed limitations
5. Space requirements It is, therefore, an object of the invention to provide a DC to AC analogue converter which requires no electromechanical components.

It is a further object of the invention to provide a DC to AC analogue converter which is completely electronic.

In accordance with the invention, apparatus for converting a DC analogue signal to a corresponding AC analogue signal comprises; a high gain differential amplifier having two input terminals and an output terminal; means for applying an AC reference signal at a first frequency to one of said amplifier input terminals; a pulse oscillator having an average PRF and being adapted to be position modulated and comprising a modulation input terminal and an output terminal; the output terminal of said amplifier being connected to the modulation input terminal of said oscillator; a first low-pass filter having a cutoff frequency slightly greater than said first frequency and comprising an input and an output terminal; the output terminal of said oscillator being connected to the input terminal of said first filter; the output terminal of said first filter being connected to the other input terminal of said amplifier; multiplication means having two input terminals and an output terminal; the output terminal of said oscillator being connected to one input terminal of said multiplication means; means for applying said DC analogue signal to the other input terminal of said multiplication means; a second low-pass filter substantially identical to said first low-pass filter and comprising input and output terminals; the output terminal of said multiplication means being connected to the input terminal of said second low-pass filter; and means for taking AC analogue signals from the output terminal of said second low-pass filter.

The invention will be better understood from an examination of the following description together with the accompanying drawings in which.

Like reference numerals denote like parts in both figures.

Figure 1:
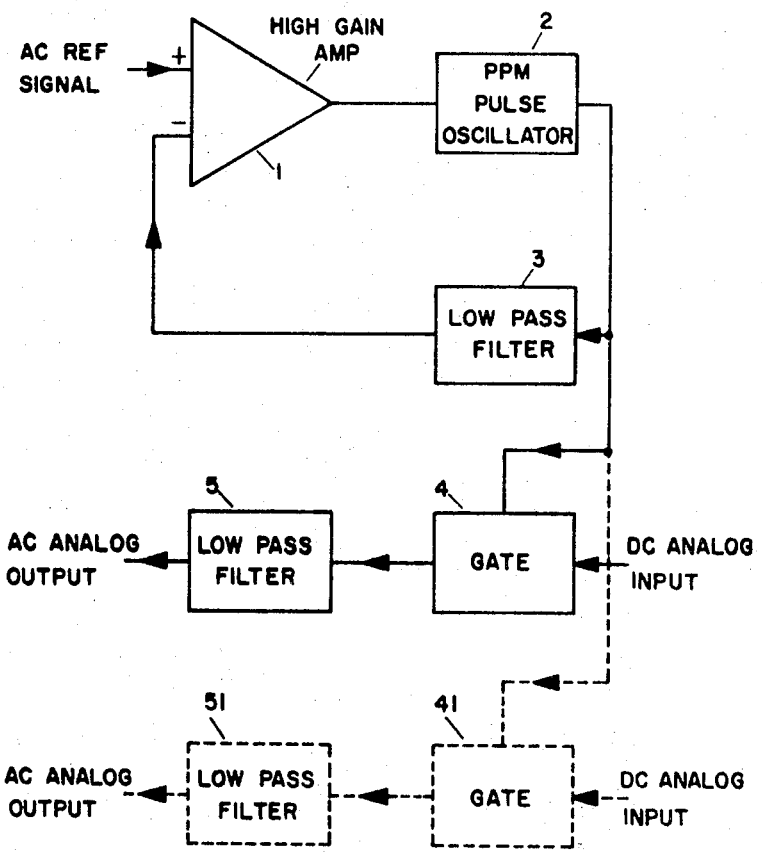
FIG. 1 is a block diagram of one embodiment of the invention.

In FIG. 1, 1 is a high gain differential amplifier fed at its noninverting input with an AC reference signal. The output of the amplifier position modulates a p.p.m. pulse oscillator 2, and the pulse position modulated train of pulses is applied to the input of a low-pass filter 3 with a cutoff frequency slightly higher than 400 Hz. The output of the filter 3 is fed to the inverting input of the differential amplifier.

The pulse position modulated train of pulses is also fed to the control input of a gate 4, which is fed at its signal input with the DC analogue voltage. The output of gate 4 is applied to a low-pass filter 5 which is substantially identical (to the extent that it is physically possible) to filter 3. The AC analogue signal is taken from the output of filter 5.

In operation, the system works as follows. The output of the amplifier position modulates the pulse oscillator which provides a pulse train of fixed pulse width with a repetition frequency higher than 400 Hz. In order to reproduce the AC analogue with full fidelity, a PRF at least a hundred times larger than the reference frequency should be used.

The modulated output of the oscillator is a pulse train wherein the position of a pulse, relative to the preceding pulse, is a function of the amplitude of the modulating voltage, i.e. the depth of modulation is proportional to the voltage swing. In addition, the pulses approach and separate from each other at the rate of the modulating frequency—in the illustrated case, at 400 Hz. Thus, the 400 Hz. reference signal is encoded in the modulated output of the oscillator.

When the pulse train is passed through filter 3, whose cutoff frequency is slightly greater than 400 Hz., the output of the filter is a replica of the reference signal, but with a different amplitude which is determined by the transfer function of the pulse oscillator and the filter 3.

If the transfer function could be accurately, definitively, and permanently determined, it would be sufficient to use the open loop position modulated pulse train. However, as the transfer function cannot be so determined and maintained, it is necessary to provide a closed loop feedback arrangement, and to this end, the output of the filter 3 is fed as the other input to the differential amplifier 1. When the pulse oscillator is modulated by the amplified difference between the filter output and the AC reference voltage, the output of filter 3 becomes substantially a replica of the reference voltage, independent of any transfer functions, provided that the gain of the amplifier is high enough.

If the pulse train is now multiplied by the DC analogue voltage, and then passed through a filter identical to filter 3, the output of this second filter would be a 400 Hz. signal whose amplitude is proportional to the DC analogue voltage amplitude. This is, of course, the AC analogue voltage.

In the embodiment illustrated in FIG. 1, the multiplication is accomplished by gate 4. The pulse train opens and closes the gate to pass or inhibit the DC analogue signal, so that the output of the gate is a pulse train corresponding to the pulse train at the input, but having the amplitude of the DC analogue voltage. When the gated pulse train is applied to low-pass filter 5, which is identical to low-pass filter 3, the output of filter 5 is a replica of the AC reference with an amplitude proportional to the DC analogue level.

If the level of the AC reference were to change, the depth of modulation is changed accordingly, and this results in the same percentage change in AC analogue output, in the same manner as it does with the potentiometer arrangement described above.

The pulse train could be used to drive several gates for different DC analogue signals as is shown in dotted lines in FIG. 1. Thus, the system lends itself to economy as the number of gates is limited only by the driving capability of the pulse oscillator.

Figure 2:
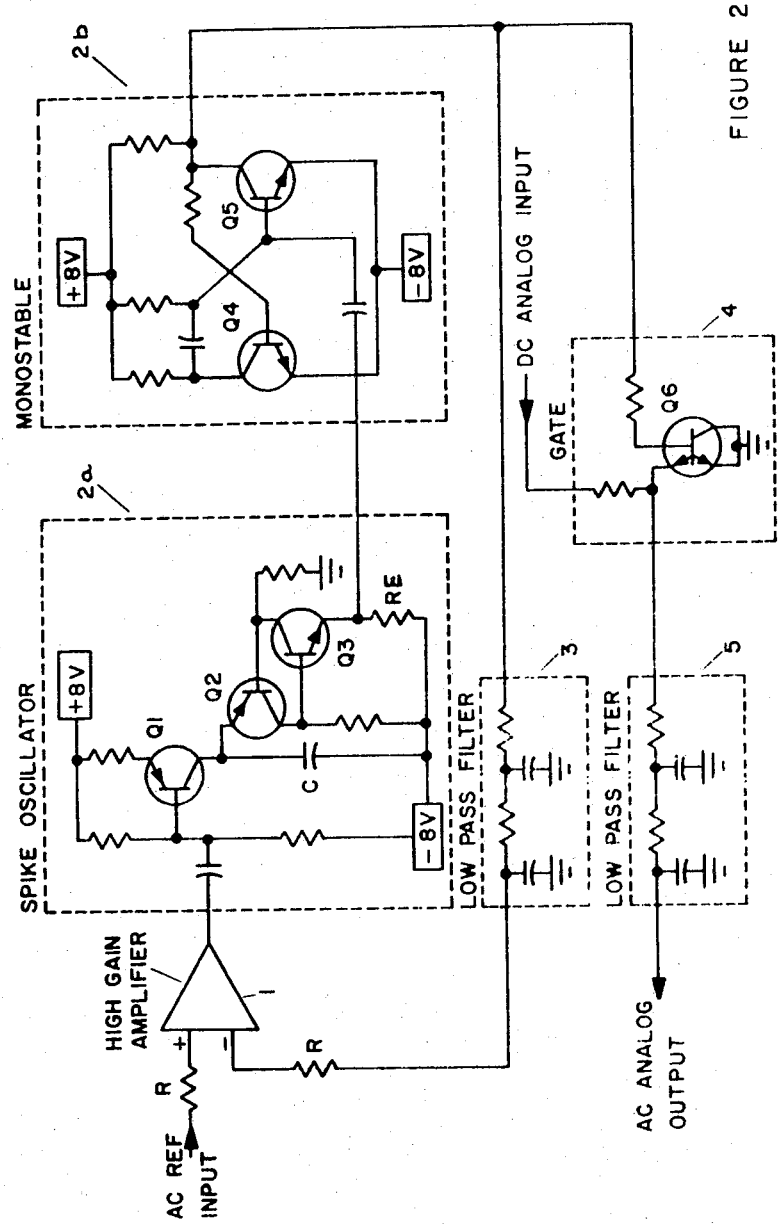
FIG. 2 is a circuit diagram of one embodiment of the invention.

FIG. 2 illustrates a simplified schematic of circuits to perform the functions described with relation to FIG. 1. The schematic has been simplified to aid understanding, and fuller particulars, as well as variations of the schematic are left to the discretion of individual designers who may have to meet different requirements relating to precision and stability.

The p.p.m. pulse oscillator is shown as being composed of a spike generator 2a and a monostable 2b. The filters are illustrated as consisting of simple RC networks, and the gate comprises a chopper transistor Q6.

Capacitor C is charged through Q1 at a linear rate determined by the biasing point of Q1. When C is charged to some predetermined value, Q2 and Q3 are turned on, and C discharges through Q2 and Q3, causing a current to flow in $R_e$. When C is discharged to a second predetermined value, Q2 and Q3 stop conducting, so that current flow in $R_E$ ceases. This action produces a voltage spike across $R_E$ which triggers the monostable 2b to provide a pulse of fixed width for each spike at the output of the monostable. The pulse train thus produced has an average spacing determined by the quiescent current through Q1 and an instantaneous spacing determined by the instantaneous value of modulating signal provided by the amplifier.

It must be cautioned that the fixed delay of the monostable must be shorter than the shortest instantaneous spike spacing to avoid overlapping of pulses and the resultant distortion.

The pulse train is fed to low-pass filter 3 whose output is applied to the other terminal of differential amplifier 1. The same pulse train controls chopper transistor Q6 which has the DC analogue applied at its signal input terminal. The output of the chopper is fed to low-pass filter 5 which is substantially identical to low-pass filter 3, and the AC analogue signal is taken at the output of filter 5. Transformation accuracies approaching one-tenth percent have been achieved with circuits of this nature.

Since this is a completely electronic circuit, the power consumption is much lower than its electromechanical equivalent. In addition, the electronic components are more reliable, and the cost is less as very simple circuitry is used. The AC analogue tracks the DC analogue very quickly as there is no mechanical positioning involved, and the space requirements are greatly reduced as compared with electromechanical equivalent.

Although a preferred embodiment has been described in the foregoing, it is understood that this was for the purpose of illustrating, but not limiting, the invention. Various modifications which will come readily to the mind of one skilled in the art are considered to be within the scope of the invention as defined in the appended claims.

I claim:

1. Apparatus for converting a DC analogue signal to a corresponding AC analogue signal comprising: a high gain differential amplifier having two input terminals and an output terminal; means for applying an AC reference signal at a first frequency to one of said amplifier input terminals; a pulse oscillator having an average PRF and being adapted to be position modulated and comprising a modulation input terminal and an output terminal; the output terminal of said amplifier being connected to the modulation input terminal of said oscillator; a first low-pass filter having a cutoff frequency slightly greater than said first frequency and comprising an input and an output terminal; the output terminal of said oscillator being connected to the input terminal of said first filter; the output terminal of said first filter being connected to the other input terminal of said amplifier; multiplication means having two input terminals and an output terminal; the output terminal of said oscillator being connected to one input terminal of said multiplication means; means for applying said DC analogue signal to the other input terminal of said multiplication means; a second low-pass filter substantially identical to said first low-pass filter and comprising input and output terminals; the output terminal of said multiplication means being connected to the input terminal of said second low-pass filter; and means for taking AC analogue signals from the output terminal of said second low-pass filter.

2. Apparatus as defined in claim 1 wherein said average PRF is at least 100 times said first frequency.

3. Apparatus as defined in claim 2 and further being adapted to convert a plurality of DC analogue signals to their corresponding AC analogue signals comprising; a plurality of multiplication means each having two input terminals and an output terminal; the output terminal of said oscillator being connected to each of said one input terminals of said multiplication means; means for applying a separate one of said DC analogue signals to each said other multiplication means input terminals; a plurality of second filters, the number of second filters being equal to the number of multiplication means; the output terminals of each of said multiplication means being connected to a separate one of the input terminals of said second filters; and means for taking the AC analogue signals from the output terminals of said second filters.

4. Apparatus as defined in claim 3 wherein said one amplifier input terminal is a noninverting terminal, and said other amplifier input terminal comprises an inverting terminal.

5. Apparatus as defined in claim 4 wherein each multiplication means comprises a gate means and wherein said one multiplication means input terminal comprises a gate control terminal, and wherein said other multiplication means input terminal comprises a gate signal input terminal.

6. Apparatus as defined in claim 5 wherein said gate means comprises a chopper transistor.

7. Apparatus as defined in claim 6 wherein said oscillator comprises a spike generator and a monostable multivibrator; output from said spike generator triggering said monostable to produce a pulse of constant width for each spike; the positions of said spikes being determined by the output of said amplifier.

* * * * *